(12) United States Patent
Kuehm et al.

(10) Patent No.: US 8,943,228 B2
(45) Date of Patent: Jan. 27, 2015

(54) PERIPHERAL INTERFACE, DATA STREAM, AND DATA TRANSFER METHOD

(75) Inventors: Andreas Kuehm, Jena (DE); Nico Presser, Jena (DE); Joerg Engel, Weida (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 13/074,581

(22) Filed: Mar. 29, 2011

(65) Prior Publication Data

US 2011/0179193 A1    Jul. 21, 2011

Related U.S. Application Data

(63) Continuation of application No. PCT/EP2009/006815, filed on Sep. 22, 2009.

(30) Foreign Application Priority Data

Sep. 30, 2008   (DE) .......................... 10 2008 049 887

(51) Int. Cl.
   *G06F 3/00*      (2006.01)
   *G06F 13/00*     (2006.01)
   *G06F 13/38*     (2006.01)
   *G06F 13/28*     (2006.01)

(52) U.S. Cl.
   CPC .............. *G06F 13/385* (2013.01); *G06F 13/28* (2013.01)
   USPC .................................. 710/6; 710/29; 710/33

(58) Field of Classification Search
   None
   See application file for complete search history.

(56) References Cited

U.S. PATENT DOCUMENTS

| | | |
|---|---|---|
| 5,991,840 A | 11/1999 | Suzuki |
| 6,029,233 A | 2/2000 | Abily et al. |
| 6,490,676 B1 | 12/2002 | Cota-Robles |

(Continued)

FOREIGN PATENT DOCUMENTS

| | | |
|---|---|---|
| DE | 197 22 803 A1 | 12/1997 |
| DE | 100 29 986 A1 | 3/2001 |

(Continued)

*Primary Examiner* — Kris Rhu
(74) *Attorney, Agent, or Firm* — Westerman, Hattori, Daniels & Adrian, LLP

(57) ABSTRACT

A peripheral interface for use with a control computer and a peripheral device. The peripheral interface has a controller receiving an input data stream from the control computer and delivering an output data stream to the peripheral device, the controller obtaining an instruction from the input data stream for a modification of the output data stream. Prior art devices transfer data streams for peripheral devices blockwise by means of DMA using peripheral interfaces. In conventional peripheral interfaces, a burdensome real-time operating system must be used on the control computer in order have a sufficiently short reaction time to bring about a continuous, uninterrupted data stream. The invention achieves the object using a non-real-time operating system. A data stream is generated in the control computer, comprising control data ($B_n$) for the peripheral device and a segment (SOS) having spare control data to be output in case of a break in the data stream, and a leading spare data marking, particularly a jump command (JMP) past the spare control data. The data stream is received in the peripheral interface, and output to the peripheral device, wherein an instruction for a modification of the output of the data stream is identified in the received data stream, and the data stream is modified for output according to the identified instruction.

31 Claims, 6 Drawing Sheets

(56) References Cited

U.S. PATENT DOCUMENTS

| | | |
|---|---|---|
| 6,542,252 B2 | 4/2003 | Brossman et al. |
| 6,697,902 B1 * | 2/2004 | Sugimoto ............ 710/305 |
| 6,978,323 B1 * | 12/2005 | Kimura et al. .......... 710/20 |
| 7,814,358 B2 | 10/2010 | Sato et al. |
| 2002/0112004 A1 * | 8/2002 | Reid et al. ............ 709/205 |
| 2003/0131126 A1 * | 7/2003 | Cheung et al. ......... 709/238 |
| 2006/0051092 A1 | 3/2006 | Way |
| 2006/0127043 A1 * | 6/2006 | Chun et al. ............ 386/95 |
| 2007/0294500 A1 * | 12/2007 | Falco et al. ............ 711/170 |
| 2008/0005429 A1 | 1/2008 | Ludwig |
| 2008/0007820 A1 * | 1/2008 | Moehler et al. ......... 359/363 |
| 2008/0107401 A1 * | 5/2008 | Vannier ................ 386/112 |
| 2008/0123677 A1 * | 5/2008 | Cooley et al. .......... 370/419 |
| 2009/0228618 A1 | 9/2009 | Kuehm et al. |
| 2010/0030927 A1 * | 2/2010 | Heard ................. 710/23 |

FOREIGN PATENT DOCUMENTS

| | | |
|---|---|---|
| DE | 10 2007 032 750 A1 | 1/2008 |
| EP | 0 891 116 A2 | 1/1999 |
| EP | 1 863 228 A1 | 12/2007 |
| WO | WO 94/03851 A1 | 2/1994 |

* cited by examiner

PERIPHERAL INTERFACE, DATA STREAM, AND DATA TRANSFER METHOD

CROSS-REFERENCE TO RELATED APPLICATIONS

The present patent application is a continuation application of International Patent Application No. PCT/EP2009/006815, filed Sep. 22, 2009, which is based on, and claims priority to, German Patent Application No. 10 2008 049 887.4, filed Sep. 30, 2008, both of which are incorporated herein in their entireties by reference.

BACKGROUND OF THE INVENTION (1) Field of the Invention

The invention concerns a peripheral interface with a control unit, which receives a data stream from a control computer and puts it out sequentially to a peripheral device, a method for transfer of a data stream via a peripheral interface, wherein a data stream is received from a control computer and preferably output sequentially to a peripheral device, and a data stream containing control data for a peripheral device.

(2) Description of Related Art Including Information Disclosed Under 37 CFR 1.97 and 1.98

A peripheral interface is used to communicate between a control computer and one or more peripheral devices by electronic data transfer. In the prior art, peripheral devices are connected via standard interfaces, such as "USB" ("Universal Serial Bus"), "Ethernet" (IEEE 802) or "Firewire" (IEEE 1394), which provide a separate bus on the peripheral side, while they typically communicate with the control computer by one of its system buses. If a peripheral device is supposed to be controlled by the peripheral interface, the control computer or, more accurately, its central processing unit (CPA) will generate, for example, a stream of control data, which is deposited in the working memory ("random access memory (RAM)") of the control computer. The transfer to the peripheral interface is generally controlled by driver software, executed by the central processing unit, which initiates accesses of the interface component to the working memory. Access to the working memory occurs in cycles by means of direct memory access (DMA) via the system bus of the control computer. For this purpose, the peripheral interface has a DMA controller. Typically, one data block is transmitted by the DMA controller in each DMA cycle. The size of a DMA cycle as a rule corresponds to a single memory page of the working memory.

The driver software reports each DMA cycle for transfer in the DMA controller of the peripheral device. The control computer then executes other software, such as an application program with user interaction. It later receives a confirmation of the complete transfer in the form of an interrupt request (IRQ). From the interrupt request onward, the regular program execution is interrupted and in its place the driver software is executed, which must continue the data transfer by triggering the next DMA cycle. In order to continually achieve a high data transfer rate, a very short response time of the driver software to such an interrupt request is required, so that the next DMA cycle can be triggered at the proper time. In particular, in a real-time-critical system, a maximum response time must be obeyed in order to prevent a gap in the data transfer. If the control computer is not using a real-time-capable operating system, however, a deterministic processing of an interrupt request for a DMA cycle is not possible. Here, the response time to an interrupt request can increase almost arbitrarily when the system workload increases or when there are many DMA transfer processes at the same time. The number of simultaneous DMA transfer processes increases with the data transfer rate to be achieved and is furthermore determined by the size of the data amount being transmitted. If the response time of the central processing unit exceeds a critical value, there will be interruptions in the data stream.

Yet many peripheral devices depend on a continual, or gap-free data stream. For example, the scanner of a laser scanning microscope (LSM) must be permanently supplied with control data for the movement of one or more galvanometer mirrors while taking a picture. This is typically done by generating the control data stream block by block (corresponding to time intervals) and sending it from the control computer to the scanner. In this way, for example, it is possible to change the scanning movement in the short term, even while taking a picture. But when the data stream is interrupted, each galvanometer mirror carries out a free oscillatory movement from its current movement state. Depending on the momentary deflection, velocity and acceleration of the particular mirror at the time of the data stream interruption, damage can occur to the mirror (e.g., by excessive rotation) or the specimen (e.g., by overexposure).

In the prior art, thus, the disadvantage of a costly real-time operating system must be used on the control computer to prevent interruptions in the data stream.

The problem on which the present invention is based is to improve a peripheral device, a data stream, and a method of the aforementioned kind so that a data stream without gaps can be provided for a peripheral device, especially for a non-real-time-capable operating system of the control computer.

BRIEF SUMMARY OF THE INVENTION

According to the invention, the controller of the peripheral interface obtains an instruction from the received data stream for a modification of the output of the data stream. By identifying an instruction in the received data stream for a modification of the output of the data stream and outputting the data stream modified in accordance with the identified instruction, the controller can adapt the data stream to the particular conditions in accordance with the identified instruction, without a real-time-critical interaction with the control computer. Since the control computer produces the data stream, it can influence the behavior of the peripheral interface by an instruction modifying the output of the data stream. The modification, for example, can be carried out from the point in the data stream where the instruction is located, once or until otherwise instructed, or permanently. It is also conceivable that the modification is instead carried out from a time when a given condition (e.g., an external condition) is first satisfied, once or until otherwise instructed, or permanently. The instruction can also be organized, or interpreted by the controller, such that the output of the data stream is only modified if the given external condition is satisfied. For this purpose, the controller can repeatedly check whether the condition for the modification as contained in the instruction is satisfied, and only carry out the modification if and for as long as the condition is satisfied. If the condition is no longer satisfied, then the output of the data stream can continue unmodified. The modification may consist, for example, in a reordering of the contents of the data stream or a repetition of certain segments of the data stream. This type of modification may exist beforehand or alternatively it can be encoded in the instruction. Additional parameters may be encoded in the instruction in this case.

Thanks to a modification instruction contained in the data stream according to the invention, preferably a conditional one, the makeup of the data stream reaching the peripheral device can be adapted to the particular situation in a flexible manner by the peripheral interface itself, i.e., without time-critical use of the central processing unit of the control computer. For example, the modification instruction can contain a segment of substitute data ("emergency segment") with a label already known to the controller. If the controller in this example finds that the data stream provided by the control computer is interrupted, it will seamlessly continue the output to the peripheral device with the substitute data. In particular, it can repeatedly carry out the substitute output until it once again has sufficient regular data from the control computer. Thus, a gap-free output of a continuous data stream to the peripheral device can be achieved. A real-time operating system is not required. The peripheral interface can be arranged directly at the peripheral device in this case, so that it outputs analog control signals exclusively, for example. Alternatively, an additional data bus can be arranged between the peripheral interface and the peripheral device. Preferably, the instruction modifying the output contains a conditional or unconditional jump command to continue the output at a stream position which is determined by the jump command or is derivable from the jump command within the data stream. A jump command instructs the controller to modify the output by continuing it at another place in the data stream, to be indicated by the jump command. A conditional jump command instructs the controller to continue the output at the other location only if a logical condition to be indicated with the jump command is satisfied; otherwise, the controller continues the output sequentially after the jump command.

The jump command itself is in no case output to the peripheral device. The use of jump commands within the data stream allows a flexible changing of the output of the data stream to the peripheral device, without the peripheral interface having to know the internal structure of the data stream. It must only be able to identify jump commands as such and interpret a possible condition for the execution of the jump command. With conditional and unconditional jump commands, the output to the peripheral device can be modified in loops with little effort. For example, this can be used to reduce the required transmission bandwidth. Thus, a repeating segment of control data only needs to be transmitted once to the peripheral interface if a counter in the peripheral interface is initialized by means of an instruction embedded in the data stream and a conditional jump instruction brings about a finite repetition from the end to the start of the particular data segment.

Advantageously, it is also possible for the control computer to generate two or more simultaneous control data streams, all of which are transmitted to the peripheral interface, wherein the controller of the peripheral interface at a given time only outputs control data from precisely one of the data streams to the peripheral device. The output can alternate between the control data streams by modification instructions for the output that are embedded in the data streams, for example extended jump commands. This alternation can be carried out in a short time, for example, within microseconds. This rapid switching can be used, for example, in medical testing arrangements, in which various instrument functions with brief response time have to be triggered. Such a switching between several data streams can also be combined, in particular, with modification instructions for a substitute data output. For example, substitute data/emergency segments can be embedded in each of the control data streams being transmitted simultaneously.

If the data stream is made up of segments, wherein each segment has a constant length or a length identifier, each segment can contain a header, such as one in the form of one or more numerical or alphanumerical symbols. With such a header, segments with substitute data can be labeled as such. Such a label for a substitute data segment can be interpreted as a jump command past the substitute data segment, so that the substitute data are not output directly to the peripheral device. The jump destination can be determined by the controller using the absolute or explicitly indicated segment length. As an alternative to a jump command, a jump width ("offset") can be specified explicitly. The jump destination for continuing the data output then is obtained from the current position in the data stream plus the offset. Alternatively, a jump destination can be specified directly with the jump command.

In a more general embodiment of the invention, the controller identifies an interruption in the data stream being received and then by itself outputs a substitute data stream. The substitute data stream can at the same time be permanently stored for the controller, for example, in a read-only memory (ROM). For example, it might be substitute data that control the galvanometer mirrors such that an uncritical specimen region or a region outside the specimen is illuminated ("parking"). As an alternative to memory storage, the controller can generate the substitute data stream during the transmission, "on the fly", for example, from the last data regularly output to the peripheral device. This can be done, as a precaution, permanently/simultaneously to the regular output, for example, and in event of an interruption in the regular data output the output is switched only from the regular data stream to the substitute data stream. In this way, the response time for output of the substitute data stream is minimal. Alternatively, generation of the data stream can be started only after detection of the interruption.

In an advantageous, alternative embodiment, the controller can receive an instruction for a composition of the substitute data stream from the data stream. In this way, the substitute output can be organized in flexible fashion, as the control computer in this way can influence the substitute output depending on the situation. Even so, no real-time-critical interaction is required between the control computer and the peripheral interface. The instruction for the composition of the substitute data stream can be organized, for example, as an instruction for a modification of the data stream in the above-described sense, or be interpreted in this way by the controller.

Preferably, the controller ends the output of the substitute data stream when the control computer resumes the data stream to be received, and outputs the continued data stream. In this way, the data stream can be transmitted seamlessly. If an output data stream from the peripheral device is also transmitted to the control computer across the peripheral interface in addition to the control data stream to the peripheral device, the controller can reject output data coming from the period of the output of the substitute control data. In this way, the substitute data output can be made transparent to the control computer. Alternatively, it is possible for the controller of the peripheral interface to communicate the interruption in the control data stream, for example, with beginning or at the end of the substitute data output, on a separate signal line or encoded in the output data stream. The control computer itself can then reject a part of the output data stream, for example, a part that only contains output data from the period of the substitute data output.

Those configurations of the peripheral interface are preferred in which the controller receives the data stream via a system bus of the control computer. These embodiments include those in which the controller actively reads the data stream by direct memory access from the working memory of the control computer. In particular, the data transfer method described in DE 10 2008 009 634 (US 2009/0228618 A1) can be used, whose disclosure content is fully incorporated here.

The benefits of the invention can be used in particular for the control of a component of a laser scanning microscope as the peripheral device. In this way, damage to a scanner or to a specimen can be avoided.

Advantageously, the peripheral interface is configured as a plug-in card for the control computer or as a circuit for use in the control computer. In this way, its controller has access to the system bus with little expense and especially to the working memory of the control computer. Furthermore, a plug-in card requires only little space.

The invention also comprises a data stream, which contains one segment with substitute control data to be output in event of a data stream interruption and a substitute data label leading the segment. Advantageously, the substitute data label is a conditional or unconditional jump command past the substitute control data. In particular, a conditional or unconditional jump command back into the substitute control data segment can be disposed in the substitute control data, especially at its end.

It is especially advantageous for the substitute control data to be formed, prior to a changeover to subsequent normal control data, so that it places the peripheral device in the same state as does the normal control data preceding the substitute control data. In this way, the substitute data output can be made transparent to the control computer.

BRIEF DESCRIPTION OF THE SEVERAL VIEWS OF THE DRAWINGS

The invention will now be explained more closely by means of sample embodiments. In the drawings are shown.

In all drawings, comparable parts have the same reference numbers.

DETAILED DESCRIPTION OF THE INVENTION

Figure 1:
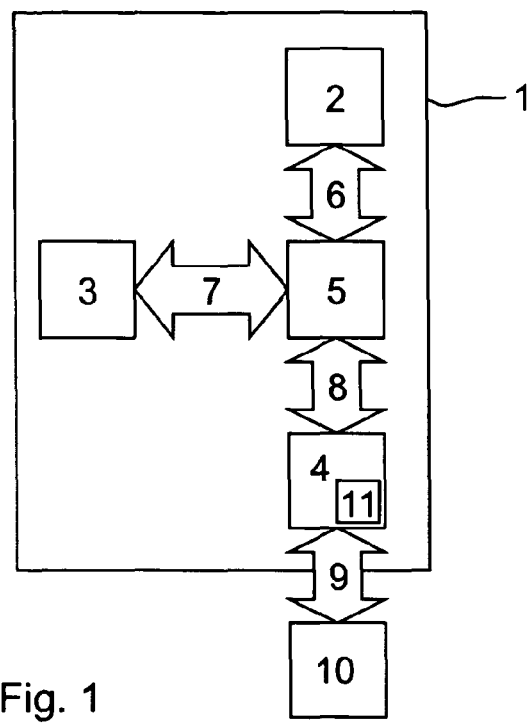
FIG. 1 is a block diagram of a first control computer with connected peripheral device.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a control computer 1 with a central processing unit 2, a working memory 3, a peripheral interface 4 according to the invention and a bridge component 5 as a connecting link between processor bus 6, memory bus 7 and system bus 8. At the peripheral interface 4, a peripheral device 10 is connected via a peripheral bus 9. The bridge component 5 mediates memory access without driver expense for the central processing unit 2. In this way, the controller 11 of the peripheral interface 4 can access the working memory 3 of the control computer 1 and directly read and write via the system bus 8. The controller 11 is configured as a field programmable gate array (FPGA). The data transfer process is encoded in the firmware or in the FPGA program of the FPGA. The peripheral interface 4 is configured, for example, as a PCI (peripheral component interconnect) Express plug-in card with a detachable system bus connection (not shown) and a detachable peripheral bus connection (not shown).

Figure 2:
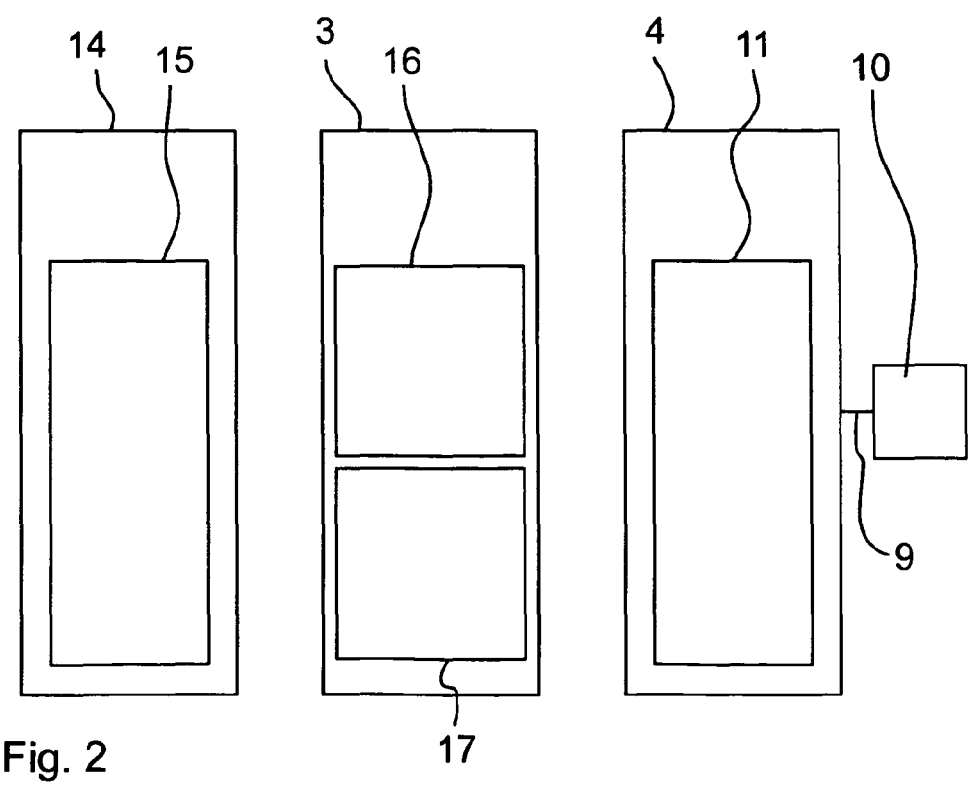
FIG. 2 is a schematic diagram of the organization of buffers in the working memory of the first control computer.

FIG. 2 shows how buffers are set up by the control computer 1 in its working memory 3. The central processing unit 2 of the control computer 1 executes software 14 in which subroutines are organized with software logic 15 to carry out the portion of the method of the invention pertaining to the control computer 1. Independently of the software 14 and the central processing unit 2, the controller 11 of the peripheral interface 4 carries out the complementary part of the method of the invention. When there are two unidirectional data streams of opposite direction, the software 14 advantageously reserves a sending buffer 16 and a receiving buffer 17. The sending buffer 16 lets the control computer 1 store data that is supposed to be read out by the controller 11 and transmitted to the peripheral device 10 by the software 15. The receiving buffer 17 lets the peripheral interface 4 store data that was received from the peripheral device 10 and that is to be read out by the software 14 by means of the controller 11. Both buffers 16, 17 are addressed by both the control computer 1 and the peripheral interface 4 as ring buffers, for example. But the invention can also be realized with any other kind of memory management.

Each of the buffers 16 and 17 consists, for example, of several distributed blocks of the working memory 3 that are assembled into a virtual contiguous FIFO (First In First Out) buffer. The buffers 16 and 17 are reserved as non-pageable buffers by the software 14 and have a size of 32 MBytes each. They can also have other and different sizes in other embodiments (not depicted). It is also possible to reserve one or both buffers as a physical contiguous block. The cache (not shown) of the central processing unit 2 is disabled for the address ranges in which the buffers 16 and 17 are situated. After the reserving operation, the software 14 informs the controller 11 as to the starting address and size of the read buffer 16 and the write buffer 17. For this purpose, the controller 11 makes available two hardware registers, which are mapped in the address region of the central processing unit 2.

The peripheral interface 4, for example, comprises a storage buffer (not shown) with a size of 8 kilobytes for each direction of transfer. The first storage buffer is used to temporarily store data that was read out from the sending buffer 16 of the control computer 1, before the further transmission via the peripheral bus 9 to the peripheral device 10. The second storage buffer is used to temporarily store data that was received from the peripheral device 10 via the peripheral bus 9 before being written into the receiving buffer 17 of the control computer 1. In other embodiments, other storage buffer sizes can also be provided.

The controller 11 receives the data stream, block by block for example, in data blocks of 4 KBytes each. Once the first block is fully contained in the first storage buffer, the data located in the first storage buffer are output sequentially, i.e., for example, byte-by-byte or word-by-word. During this process, depending on the size of the storage buffer, one or more additional data blocks can already be received and written into the first storage buffer. The output is continued seamlessly with this data block.

If the central processing unit 2 of the control computer 1 embeds an instruction for modification of the output while creating the data stream for the peripheral device 10, the actual modification does not have to be carried out by the control computer 1. Instead, the modification of the output can be done in the peripheral interface 4 by the controller 11, without the need to have any detailed knowledge as to the content of the data stream. A real-time-critical interaction with the central processing unit 2 is not required. The controller 11 must only be able to identify a modification instruction as such in the data stream. For this purpose, a particular bit or byte combination can be stipulated as a label for a modification instruction, for example. If the controller 11 of the peripheral interface 4 identifies a modification instruction, different response options can be considered. For example, the modification instruction can consist of a block segment that contains a substitute data stream that is not output directly by the controller 11, but instead copied to a special emergency buffer. If the controller 11 later ascertains that the data stream from the control computer 1 is interrupted, it can output the substitute data stream from the emergency buffer to the peripheral device 10 either one time or repeatedly until regular data from the control computer 1 is again available. Other options will be described hereafter using the example of a laser scanning microscope, but without being limited to this special application.

Figure 3:
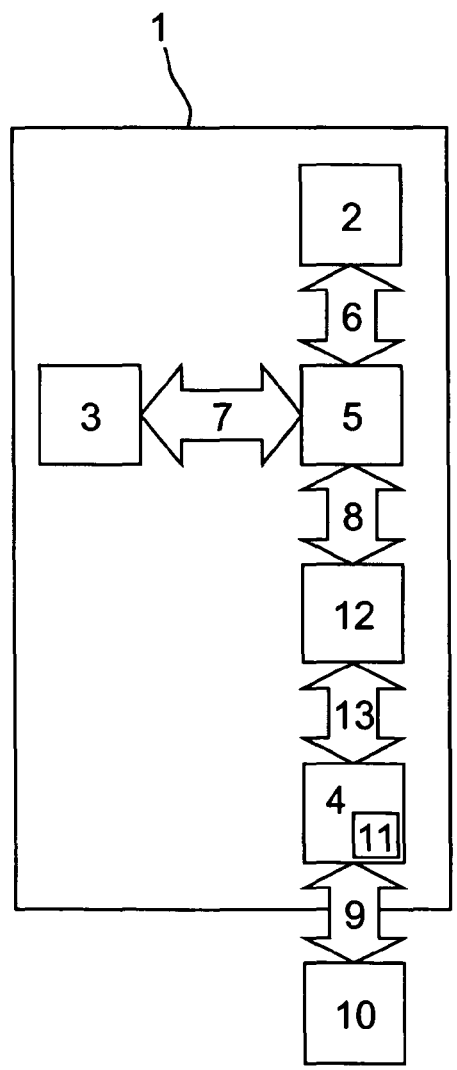
FIG. 3 is a block diagram of a second control computer with connected peripheral device.

A direct access of the controller 11 to the working memory 3 is also possible in the configuration depicted in FIG. 3. Here, the peripheral interface 4 of the invention is connected by a second bridge component 12 and an intermediate bus 13 to the system bus 8; otherwise, the arrangement is identical to that shown in FIG. 2. Thanks to the mediating of the second bridge component 12, the direct memory accesses are correspondingly delayed in this configuration. Also here the peripheral interface 4 is configured as a PCI Express plug-in card like that shown in FIG. 1; alternatively, the configuration as a CardBus plug-in card is possible, for example. The method of the invention can be carried out both with the configuration of FIG. 1 and with the configuration of FIG. 3. In both configurations, the plug-in card can have, as the peripheral interface, an LVDS (low voltage differential signaling) interface, for example, where the data stream is output to the peripheral device 10.

Figure 4:
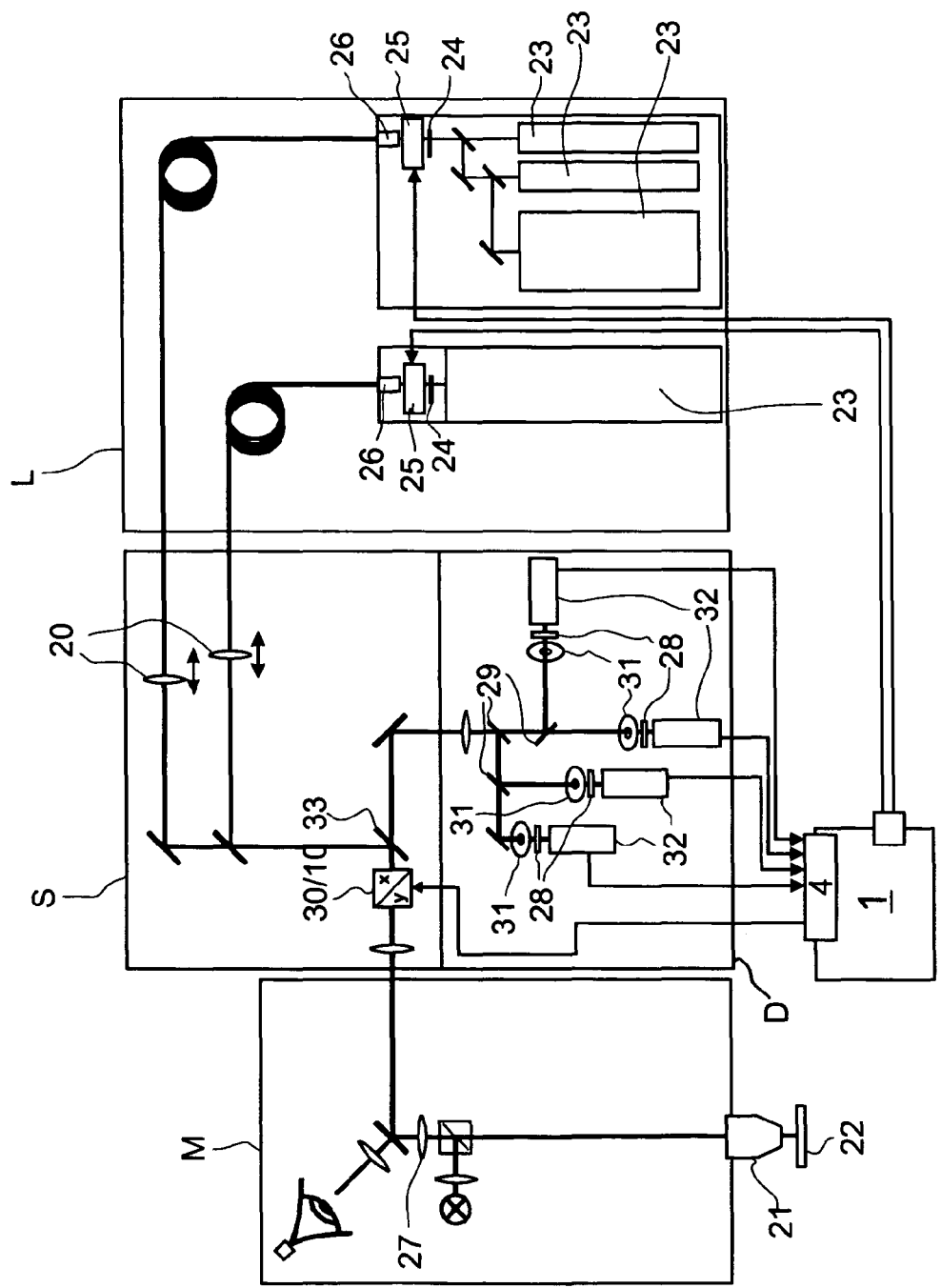
FIG. 4 is a diagram of a laser scanning microscope (LSM) with a control computer.

FIG. 4 is a schematic representation of an LSM that is controlled by means of a control computer 1. The LSM is of modular assembly from an illumination module L with lasers 23, a scanning module S, a detection module D, and the microscope unit M with the microscope objective 21. The light from the laser 23 can be regulated by light shutters 24 and attenuator 25 from the control computer 1, before the laser light is supplied to the scanning unit S via optical fibers and coupling optics 20 and combined. Via the main beam splitter 33 and the X-Y scanner 30, which has two galvanometer mirrors (not shown), the laser light passes through the microscope objective 21 and gets to the specimen 22, where it illuminates a focus volume (not shown). Light reflected or emitted from the specimen passes through the microscope objective 21 via the scanner 30 through the main beam splitter 30 to the detection module D. The detection module D has several detection channels, each with a pinhole diaphragm 31, a filter 28 and a photomultiplier 32, which are separated by color splitters 29. Instead of pinhole diaphragms 31, for example when the illumination is linear, one can also use slot diaphragms (not shown). The confocal pinhole or slot diaphragms 31 are used to separate specimen light not coming from the focus volume. The photomultipliers 32 therefore detect light exclusively from the focus volume. The scanner 30, as a peripheral device 10, is connected to a control computer 1 across a peripheral interface 4, which can be configured as FIG. 1 or as FIG. 2, for example.

Figure 5A:
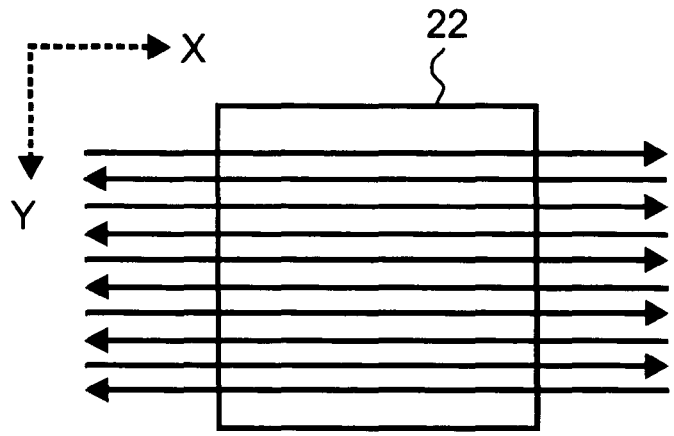
FIGS. 5A-5C are schematic representations of the two-dimensional scanning in an LSM.
Figure 5B:
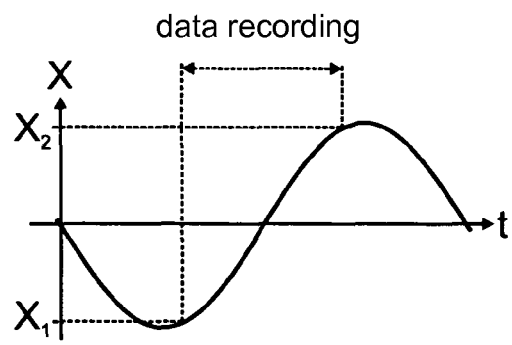
Figure 5C:
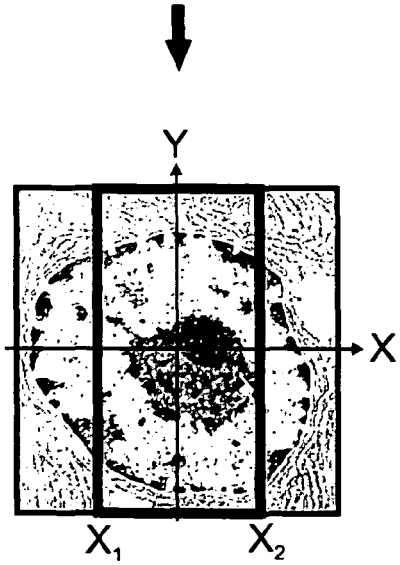

During image acquisition, for example, due to action of a user at the control computer 1, there can be a change in one or more scan parameters, such as the scanning speed, so that a change in the mirror movement becomes necessary. As the control computer 1 generates the control data in blocks, the change can already begin in the next block, i.e., can be taken into account in the control data for the next pixel line, or the one after that. The confocally illuminated and recorded focus volume of the specimen 22 can be moved across the specimen 22 by means of the scanner 30, for example in order to record an image, as the galvanometer mirrors of the scanner 30 are rotated in a specific manner. FIGS. 5A-5C show movement sequences and the result obtained. For example, one of the galvanometer mirrors performs rapid bidirectional movements in the X-direction, while the other one performs a slow, unidirectional movement in the Y-direction, typically in discrete steps during the reversal of direction of the first galvanometer mirror (FIG. 5A). The X-movement can be a sinusoidal oscillation (FIG. 5B). Usually, one pixel line is recorded during both the forward scanning movement and the back movement. Thus, one period of oscillation corresponds to the time for recording of two pixel lines. In the area of the reversal points, the lighting and the data recording can be interrupted, in order to preserve the specimen 22. In this way, only a segment of the maximum scan field (the field framed in FIG. 5C) is recorded. Both the movement of the galvanometer mirrors and the switching of the lighting by means of the light shutters 24 or the attenuator 25 are controlled directly by the control computer 1 over the peripheral interface 4. The data recording of the photomultipliers 32 likewise occurs over the peripheral interface 4.

Figure 6A:
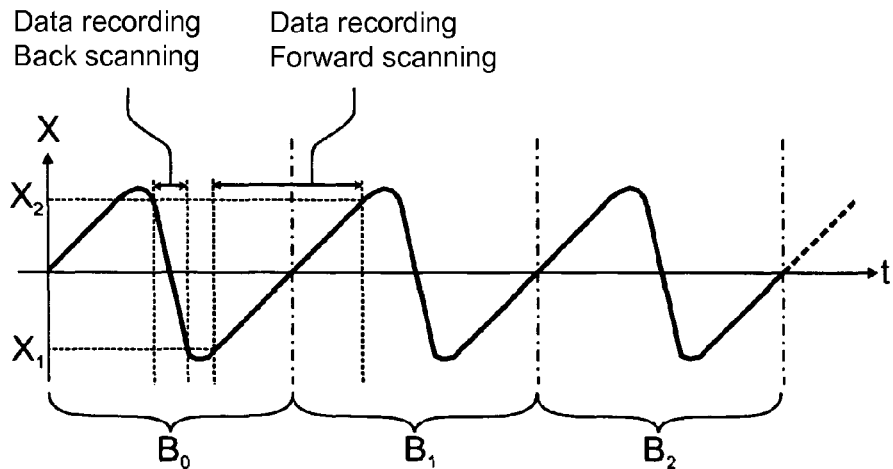
FIGS. 6A-6C are schematic representations of a periodic scanning process and data streams with modification instructions.
Figure 6B:
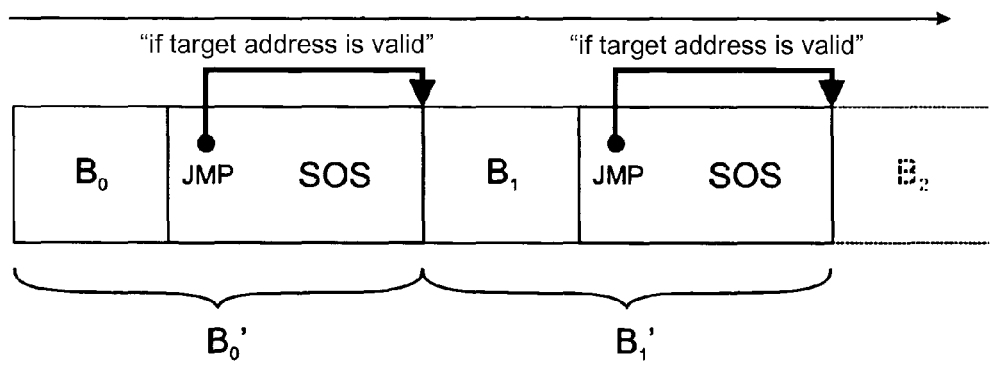
Figure 6C:
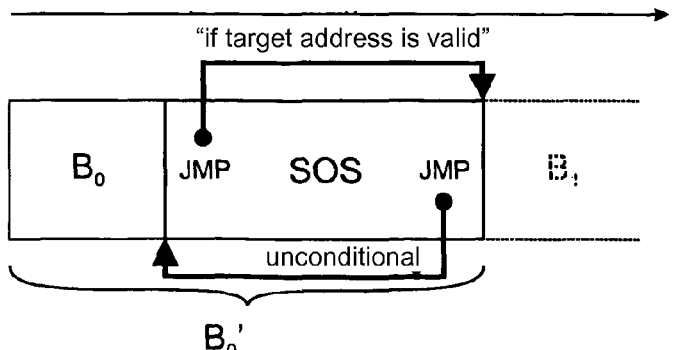

FIGS. 6A-6C show a segment from another sample movement sequence of the rapid X galvanometer mirror and segments from a sample control data stream. The scanning speeds in forward and return direction are distinctly different (FIG. 6A). Consequently, the durations of the data recording intervals are also different. One notices that the movement sequence in this example nevertheless repeats itself periodically. Here as well, one period corresponds to the time it takes to record two pixel lines. The movement of the galvanometer mirrors is controlled directly from the control computer 1. For this purpose, the control computer 1 provides a stream of control data block-by-block to the scanner 30 during a measurement, which is transmitted by the peripheral interface 4. For each period, the central processing unit 2 of the control computer 1 generates in the send buffer 16 in its working memory 3 one data block Bn' with a segment Bn that contains control data for the galvanometer mirrors and with a segment SOS that contains substitute data for the galvanometer mirrors (FIGS. 6B and 6C). In an alternative embodiment, the length of the control data segment Bn transmitted in the data stream can correspond, say, to precisely half a movement period, instead of precisely one movement period, so that two data blocks Bn' and Bn+1' are transmitted for each movement period.

At the start of each substitute data segment SOS, an unconditional relative jump command JMP is arranged, which tells the controller 11 to continue the output after the substitute data segment SOS, i.e., in a following data block Bn+1 (FIG. 6B). Since the controller 11 only performs forward jumps when the target address is valid, i.e., when valid data of a fully received data block Bn+1" are present at the jump destination, the jump commands JMP implicitly constitute an instruction to the controller 11 only to output the substitute data when no valid continuing data Bn+1 are present after outputting the control data Bn. In alternative embodiments, in which the controller 11 performs forward jumps without checking for valid data at the jump destination, the jump command instead can itself explicitly contain the condition "target address valid" ("valid data at the jump destination"). Instead of relative jump destinations (positive or negative offsets), absolute jump destinations (data stream addresses) can also be used, as long as the controller maintains an absolute output counter in the manner of a program counter (PC).

When a block Bn' is ready, the central processing unit 2 informs the controller 11 of the peripheral interface 4 via system bus 8 that a complete data block is present in the send buffer 16. This can occur, for example, according to DE 10 2008 009 634 by means of a first pointer after the end of the valid data yet to be transmitted and a second pointer at the end of the already transmitted data and thus at the start of the data yet to be transmitted. The controller 11 thereupon copies the data block into its buffer memory and outputs it seamlessly to the peripheral device 10 right after the preceding data block.

If, for example, in a non-real-time-capable operating system, the generating of a data block Bn+1 were delayed on account of high computing workload without the instructions to modify the output of the data stream according to the invention, so that it is not available to the controller 11 in good time for the continuation of the regular output, the control data of the last still fully transmitted control data block Bn would still be output to the peripheral device 10. But after this, the galvanometer mirrors would be uncontrolled. They would continue their current movement according to the laws of inertia and harmonic oscillations. In this way, the galvanometer mirrors or the specimen 22 might become damaged. According to the invention, an interruption in the data stream output to the peripheral device 10 is prevented by the embedded jump command JMP and the immediately following substitute control data SOS. For example, substitute data SOS to be output one time could control the galvanometer mirrors such that a noncritical specimen region or a region outside of the specimen is illuminated in stationary manner ("parking") until regular control data Bn+1 is again available.

In an alternative embodiment (FIG. 6C), at the end of the substitute data segment SOS there is arranged a second unconditional jump command JMP, whose jump destination is the start of the substitute data segment SOS. After an interruption-triggered output of the substitute data, the controller 11 continues with the output at the start of the substitute data segment SOS. Here, it encounters the unconditional jump command JMP to the next data block Bn+1 and again checks whether this jump destination is valid. If so, it jumps to this jump destination to continue the output. The output is then continued in regular fashion. If the jump destination is invalid, the controller 11 skips the first jump command JMP and again outputs the substitute data SOS. This is a substitute data output loop, which is only exited when a following valid data block Bn+1' is present, i.e., especially a valid control data segment Bn+1. Preferably, the substitute control data contains an emergency movement curve that is configured so that the next regular control data block Bn+1 can follow directly without instability or transient events. For example, the galvanometer mirrors at the end of the substitute control data are adjusted to the same accelerations and the same deflection angles as at the end of the preceding regular control data. With such a configuration, the software 14 of the control computer 1 does not need to carry out any separate error processing.

However, it is informed by the peripheral interface 4 as to the precise length of the delay. Even without this information, the measurement data of the software 14 remains consistent, since the system status of the peripheral device 10 is the same both after processing the regular control data and the substitute data.

The individual figures of FIGS. 7A-7G show various general examples of the handling of jump commands (mnemonic JMP) by the controller 11. Solid arrows show jumps that are performed, broken arrows jumps not performed. A jump command (depending on a possible condition) is advantageously only executed by the controller 11 when valid control data is present at the jump destination. This avoids outputting undefined control data.

If only whole blocks (after transfer via the system bus 8) are declared to be valid, a forward jump will always be performed within a data block (FIG. 7A) and the output continues at the jump destination. Backward jumps within a data block (FIG. 7B) will also always be performed and the output continues at the jump destination. If the next data block Bn+1 is not yet fully transmitted, a forward jump into this block Bn+1 (FIG. 7C) will not be performed and instead the output will continue immediately after the jump command. If the next data block Bn+1 is complete, and thus the jump destination ("target address") is valid, a forward jump will be done into this block Bn+1 (FIG. 7D) and the output continued at the jump destination.

The jump commands can be nested. For example, between a forward jump command and its jump destination there can be a backward jump command with a jump destination before the forward jump command. If the next data block Bn+1 is not yet fully transmitted (FIG. 7E), the forward jump into this block Bn+1 is not executed and instead the output immediately after the jump command continues. After some time, the unconditional backward jump command will be reached, resulting in a repeating of the output until a next valid block is available. If the next data block Bn+1 is complete (FIG. 7F), the forward jump into this block Bn+1 is implemented and the output is continued at the jump destination. The data between the forward jump command and its jump destination will not be output.

Figure 7A:
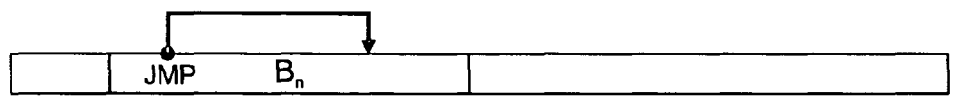
FIGS. 7A-7G illustrate possible variants of jump commands embedded in the data stream.
Figure 7B:
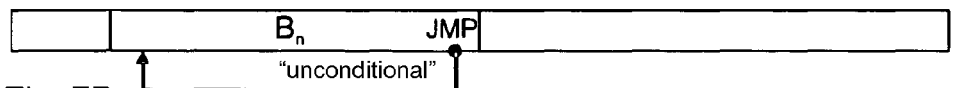
Figure 7C:
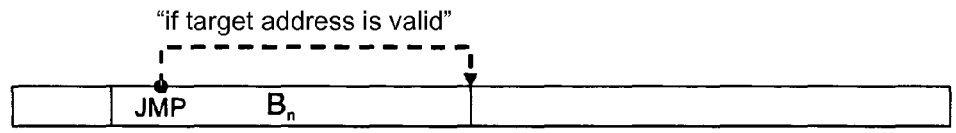
Figure 7D:
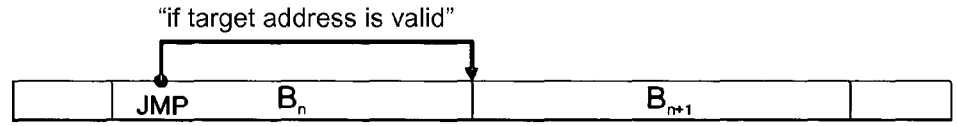
Figure 7E:
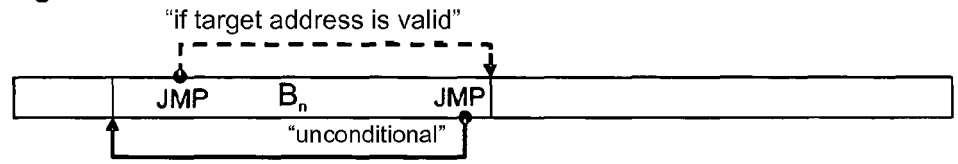
Figure 7F:
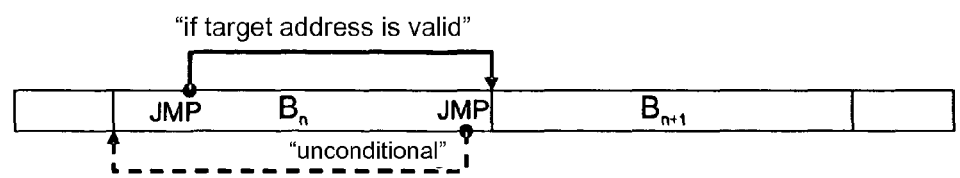
Figure 7G:
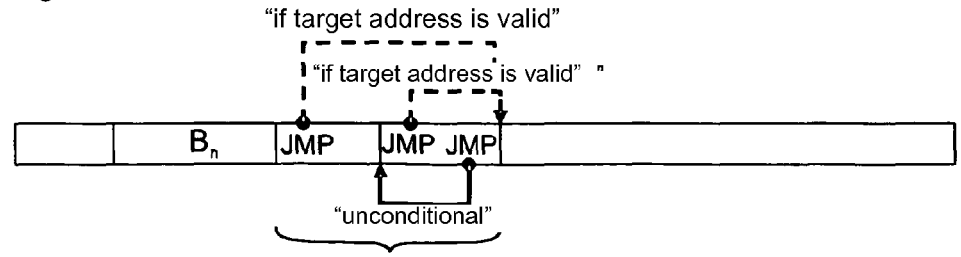

In the example of FIG. 7G, the sample emergency segment SOS contains three jump commands. Between two consecutive forward jump commands there are first substitute data, which for example bring the peripheral device into a defined state. Following the second forward jump command are second substitute control data, which hold the peripheral device 10 in the defined state. Then comes an unconditional backward jump command, whose jump destination is the second forward jump command. The forward jump commands are only performed if no valid next data block is present. In the depicted situation, no next data block is present. Therefore, the forward jumps are not carried out. As a result, at first the regular control data of block Bn are output to the peripheral device 10, then the first substitute data one time, then repeatedly the second substitute data. Only when a next valid block Bn+1 is present (not shown) is the last forward jump from the loop carried out.

Advantageously, but not necessarily, an emergency segment SOS with corresponding jump commands is provided in each data block Bn in a data stream divided into blocks. The particular emergency segment SOS can be located at the end or at any other place within the respective data block Bn. A second alternative embodiment can be realized, for example, when an unconditional forward jump takes the regular output past the emergency segment when there is a backward jump at the end of the regular control data to the emergency segment SOS, at the start of which there is a forward jump to the next block Bn+1 (executed by the controller 11 only when the jump destination is valid).

In further embodiments, the jump commands can involve conditions other than the validity of jump destinations. For example, in connection with an initialization command for a counter kept in the controller 11, jump commands with increment or decrement and a condition for the counter status can be realized. In this way, output loops with a predetermined number of iterations can be programmed. Such loops can contain regular control data, for example. For example, the control data for a two-dimensional image recording in an LSM could fit in only one data block by programming two nested loops for the X and the Y galvanometer mirrors.

In general, a data stream can be divided into segments of constant size, regardless of whether it is generated and transmitted block-by-block. The offset of a jump command in such cases can be indicated as the number of segments to be jumped over. In this way, the required bit width for the offset indication can be reduced as compared to an indication in bytes, for example. With a segment size of 256 bytes and a bit width of the offset indications of 8 bits, even though jumps are then only possible in steps of 256 bytes, but on the other hand over +/−127 segments instead of only over +/−127 bytes.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

LIST OF REFERENCE NUMERALS 1 control computer
2 central processing unit
3 working memory
4 peripheral interface
5 bridge component
6 processor bus
7 memory bus
8 system bus
9 peripheral bus
10 peripheral device
11 controller
12 bridge component
13 intermediate bus
14 software
15 software logic
16 sending buffer
17 receiving buffer
20 collimation optics
21 microscope objective
22 specimen
23 laser
24 light shutter
25 attenuator
26 fiber coupler
27 barrel lens
28 filter
29 dichroic beam splitter
30 X-Y scanner
31 pin diaphragm
32 photomultiplier
33 main beam splitter
D detection module
M microscope
L lighting module
S scanning module

What is claimed is:

1. A peripheral interface for transferring a data stream between a control computer and a peripheral device, wherein the control computer includes a central processing unit configured for generating a data stream across the peripheral interface for controlling the peripheral device, and wherein the data stream sent by the central processing unit to the peripheral interface comprises control data for the peripheral device, the control data including a segment with substitute control data to be output by the peripheral interface in the event of an input data stream interruption and a leading substitute data label as an instruction for a modification of the data stream output to the peripheral device by the peripheral interface, and wherein the instruction contains at least one of a conditional jump command and an unconditional jump command to continue the output at a stream position which is determined from the jump command or is derivable from the jump command, the peripheral interface comprising:

a controller for receiving as an input data stream the data stream sent by the central processing unit to the peripheral interface, for identifying in the input data stream the instruction for a modification of the data stream, for modifying the data stream for output by the peripheral device in accordance with the identified instruction to continue the output at a stream position which is determined from the jump command or is derivable from the jump command, and for delivering the modified data stream from the peripheral interface to the peripheral device, wherein the peripheral interface outputs the substitute control data to the peripheral device in the event of an input data stream interruption.

2. The peripheral interface according to claim 1, wherein the instruction contains a condition for a modification, and the controller includes means for repeatedly checking whether this condition is satisfied, and only executes the modification if the condition is satisfied.

3. The peripheral interface according to claim 1, wherein the controller further comprises means for receiving several data streams from the control computer, and means for selecting only one data stream to be delivered to the peripheral device based on the modification instruction.

4. The peripheral interface according to claim 1, wherein the control computer includes a system bus, and wherein the controller receives the input data stream via the system bus.

5. The peripheral interface according to claim 1, wherein the peripheral interface is configured as one of a plug-in card for the control computer and a circuit for use in the control computer.

6. The peripheral interface according to claim 1, wherein the peripheral device is a component of a laser scanning microscope.

7. The peripheral interface according to claim 1, wherein the peripheral interface in the event of an input data stream interruption, repeatedly outputs the substitute control data to the peripheral device as long as the input data stream interruption persists.

8. The peripheral interface according to claim 1, wherein the instruction contains at least one unconditional jump command.

9. The peripheral interface according to claim 1, wherein the instruction contains at least one conditional jump command.

10. A laser scanning microscope comprising:
a peripheral interface;
a control computer including a central processing unit configured for generating a data stream of control data to the peripheral interface, wherein the data stream includes an instruction for a modification of the data stream output to the peripheral device by the peripheral interface, and wherein the instruction contains at least one unconditional jump command to continue the output at a stream position which is determined from the jump command or is derivable from the jump command; and
a component controlled by the control computer,
wherein the peripheral interface includes a controller for receiving as an input data stream the data stream sent from the control computer, for identifying in the input data stream the instruction for a modification of the data stream, for modifying the data stream for output by the peripheral interface in accordance with the identified instruction to continue the output at a stream position which is determined from the jump command or is derivable from the jump command, and for delivering the modified data stream from the peripheral interface to the component.

11. The laser scanning microscope according to claim 10, wherein:
the controller of the peripheral interface copies the output data stream to a buffer, after generating the output data stream,
the controller of the peripheral interface delivers the output data stream to the component from the buffer,
the data stream sent by the control computer comprises control data for the peripheral device, the control data including a segment with substitute control data to be output by the peripheral interface in event of a data stream interruption and a leading substitute data label, and
wherein the peripheral interface uses the leading substitute data label to identify the instruction for modification of the data stream.

12. The laser scanning microscope according to claim 11, wherein the peripheral interface in the event of an input data stream interruption, repeatedly outputs the substitute control data to the peripheral device as long as the input data stream interruption persists.

13. The laser scanning microscope according to claim 11, wherein the substitute data label comprises one of a conditional and unconditional jump command past the substitute control data.

14. The laser scanning microscope according to claim 13, wherein the substitute control data includes one of a conditional and unconditional jump command back into the substitute control data segment.

15. The laser scanning microscope according to claim 10, wherein the instruction also contains at least one conditional jump command.

16. The laser scanning microscope according to claim 10, wherein the peripheral interface is arranged in the control computer.

17. A method for the transfer of a data stream from a central processing unit of a control computer to a peripheral device controlled by the control computer, across a peripheral interface of the control computer, the peripheral interface including a controller, the method comprising the steps of:
sending a data stream generated by the central processing unit to the peripheral interface, wherein the data steam sent by the central processing unit includes an instruction for a modification of the data stream output to the peripheral device by the peripheral interface, and wherein the instruction contains at least one unconditional jump command to continue the output at a stream position which is determined from the jump command or is derivable from the jump command;
receiving the data steam at the peripheral interface as an input data stream;
with the controller of the peripheral interface, identifying in the input data stream the instruction for a modification of the output data stream;
with the controller of the peripheral interface, modifying the output data stream in accordance with the identified instruction; and
delivering the output data stream from the peripheral interface to the peripheral device.

18. The method according to claim 17, wherein the modifying step only occurs when a condition for the modification as contained in the identified instruction is satisfied.

19. The method according to claim 17, the method further comprising the steps of:
receiving several input data streams at the peripheral interface from the control computer;
choosing only one of the several data streams for delivery by the peripheral interface to the peripheral device, according to the modification instruction; and
delivering the chosen one of the several data streams as the output data stream from the peripheral interface to the peripheral device.

20. The method according to claim 17 further comprising the steps of:
identifying an interruption in the data input data stream being received and then outputting a substitute data stream.

21. The laser scanning microscope according to claim 17, wherein the instruction also contains at least one conditional jump command.

22. A method for the transfer of a data stream from a central processing unit of a control computer to a peripheral device controlled by the control computer, across a peripheral interface of the control computer, the peripheral interface including a controller, the method comprising the steps of:
sending a data stream generated by the central processing unit to the peripheral interface, wherein the data steam sent by the central processing unit includes an instruction for a modification of the data stream output to the peripheral device by the peripheral interface, and wherein the instruction contains a conditional or unconditional jump command to continue the output at a stream position which is determined from the jump command or is derivable from the jump command;
receiving the data steam at the peripheral interface as an input data stream;
with the controller of the peripheral interface, identifying in the input data stream the instruction for a modification of the output data stream;
with the controller of the peripheral interface, modifying the output data stream in accordance with the identified instruction;
delivering the output data stream from the peripheral interface to the peripheral device; and
with the controller of the peripheral interface, identifying an interruption in the data input data stream being received and then outputting a substitute data stream, wherein the substitute data stream is formed prior to a changeover to subsequent normal control data, so that the substitute data stream places the peripheral device in the same state as does the normal control data preceding the substitute data stream.

23. A peripheral interface for transferring a data stream between a control computer and a peripheral device that is a component of a laser scanning microscope, wherein the control computer includes a central processing unit for sending a data stream across the peripheral interface for controlling the peripheral device, wherein the data stream sent by the central processing unit to the peripheral interface includes an instruction for a modification of the data stream output to the peripheral device by the peripheral interface, and wherein the instruction contains a conditional or unconditional jump command to continue the output at a stream position which is determined from the jump command or is derivable from the jump command, the peripheral interface comprising:
 a controller for receiving as an input data stream the data stream sent by the central processing unit to the peripheral interface, for identifying in the input data stream the instruction for a modification of the data stream, for modifying the data stream for output by the peripheral device in accordance with the identified instruction to continue the output at a stream position which is determined from the jump command or is derivable from the jump command, and for delivering the modified data stream from the peripheral interface to the peripheral device;
wherein:
the peripheral device is a scanner with a periodic movement, wherein one movement period corresponds to the time for recording of two pixel lines, and
the control computer provides the data stream block-by-block to the scanner during a measurement, and for each movement period, generates one data block Bn' with a segment Bn that contains control data for the scanner and with a segment SOS that contains substitute data for control of the scanner.

24. The peripheral interface according to claim 23, wherein:
at the start of each substitute data segment SOS, an unconditional relative jump command JMP is arranged,
the unconditional relative jump commands JMP tell the controller to continue the output after the substitute data segment SOS in a following data block Bn+1, and
the controller only performs forward jumps when valid data of a fully received data block Bn+1" are present at the jump destination.

25. The peripheral interface according to claim 23, wherein at the start of each substitute data segment SOS, an unconditional relative jump command JMP is arranged.

26. The peripheral interface according to claim 23, wherein:
at the start of each substitute data segment SOS, a jump command JMP is arranged,
the jump commands JMP explicitly contain the condition "target address valid," and
the controller is not required to check for valid data at the jump destination in order to perform forward jumps.

27. The peripheral interface according to claim 23, wherein:
at the start of each substitute data segment SOS, an unconditional absolute jump destination is arranged, and
the controller maintains an absolute output counter.

28. A laser scanning microscope comprising:
a peripheral interface;
a control computer for sending a data stream of control data to the peripheral interface, wherein the data stream includes an instruction for a modification of the data stream output to the peripheral device by the peripheral interface, and wherein the instruction contains a conditional or unconditional jump command to continue the output at a stream position which is determined from the jump command or is derivable from the jump command; and
a component controlled by the control computer,
wherein:
the peripheral interface includes a controller for receiving as an input data stream the data stream sent from the control computer, for identifying in the input data stream the instruction for a modification of the data stream, for modifying the data stream for output by the peripheral interface in accordance with the identified instruction to continue the output at a stream position which is determined from the jump command or is derivable from the jump command, and for delivering the modified data stream from the peripheral interface to the component;
the component controlled by the control computer is a scanner with a periodic movement, wherein one movement period corresponds to the time for recording of two pixel lines, and
the control computer provides the data stream block-by-block to the scanner during a measurement, and for each movement period, generates two data blocks Bn' and Bn+1' with a segment Bn that contains control data for the scanner and with a segment SOS that contains substitute data for control of the scanner.

29. The laser scanning microscope according to claim 27, wherein:
at the start of each substitute data segment SOS, an unconditional relative jump command JMP is arranged,
the unconditional relative jump commands JMP tell the controller to continue the output after the substitute data segment SOS in a following data block Bn+1, and
the controller only performs forward jumps when valid data of a fully received data block Bn+1" are present at the jump destination.

30. The laser scanning microscope according to claim 28, wherein:
at the start of each substitute data segment SOS, a jump command JMP is arranged,
the jump commands JMP explicitly contain the condition "target address valid," and
the controller is not required to check for valid data at the jump destination in order to perform forward jumps.

31. The laser scanning microscope according to claim 28, wherein:
at the start of each substitute data segment SOS, an unconditional absolute jump destination is arranged, and
the controller maintains an absolute output counter.

* * * * *